March 20, 1956   C. H. MEILE   2,738,687
CONNECTING ROD
Filed Nov. 21, 1951

INVENTOR
CARL H. MEILE

Paul O. Pippel
ATT'Y.

United States Patent Office 2,738,687
Patented Mar. 20, 1956

2,738,687

CONNECTING ROD

Carl H. Meile, Fort Wayne, Ind., assignor to International Harvester Company, a corporation of New Jersey Application November 21, 1951, Serial No. 257,570

7 Claims. (Cl. 74—579)

This invention relates to connecting rods for internal combustion engines and more particularly to a novel means of holding the parts of the crankshaft bearing together without the need of bolts and lock nuts.

The primary objective of the present invention is to employ an endless strap of steel for connecting the parts of the crankshaft bearing together. By utilizing an endless strap to secure the bearing parts together the tendency of the connecting rod to fracture in the high tensile stress area defined by the juncture of the shaft of the connecting rod and the crankshaft bearing can be reduced to a minimum. Lugs are provided on the shank of the rod which are spaced on the opposite side of the high tensile stress area from the crankshaft bearing. The strap is wrapped about the exterior surface of the detachable bearing half and looped, under tension, over the lugs. It will be obvious that a compressive pre-stress is obtained in the high tensile stress area. Furthermore, the strap is uniformly stressed and the dynamic stress generally found to be extreme in prior art fastening media is reduced considerably by employing an endless strap.

The foregoing and other important objects and desirable features inherent in and encompassed by the invention, together with many of the purposes and uses thereof, will become readily apparent from a reading of the ensuing description in conjunction with the annexed drawings, in which:

Figure 3 is a cross-sectional view taken substantially along line 3—3 of Figure 2.

Figure 1:
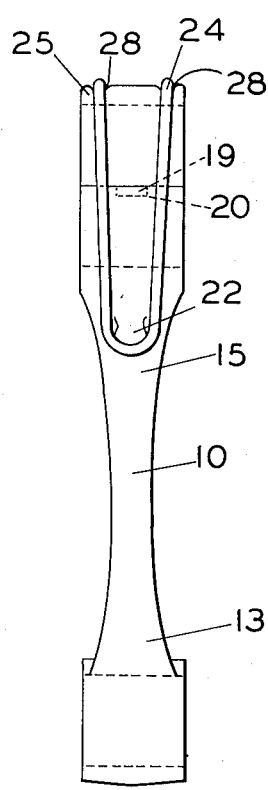
Figure 1 is a side elevational view of a connecting rod showing the invention incorporated therein.

Referring to the drawings wherein like reference characters designate like elements throughout the various views there is shown a connecting rod having an elongated shank 10 of substantially I-beam cross-section which has a central web portion 11 and flange portions 12. One end 13 is provided with an opening 14 in which the usual wrist pin (not shown) is journalled.

The opposite end 15 of the shank 10 is enlarged and is semi-cylindrical in shape to form one-half of the crankshaft bearing 16. A semi-cylindrical sleeve or cap 17, adapted to abut the semi-cylindrical end 15 of the shank, completes the crankshaft bearing 16 which receives a crank pin (not shown). The abutting surfaces 18 of the cap 17 have projections 19 extending therefrom which are insertable in mating recesses 20 formed in the abutting surfaces 21 of the end 15. The projections 19 cooperate with the recesses 20 to prevent transverse movement of the cap 17 with respect to the shank 10 when crankshaft bearing 16 is assembled.

Figure 2:
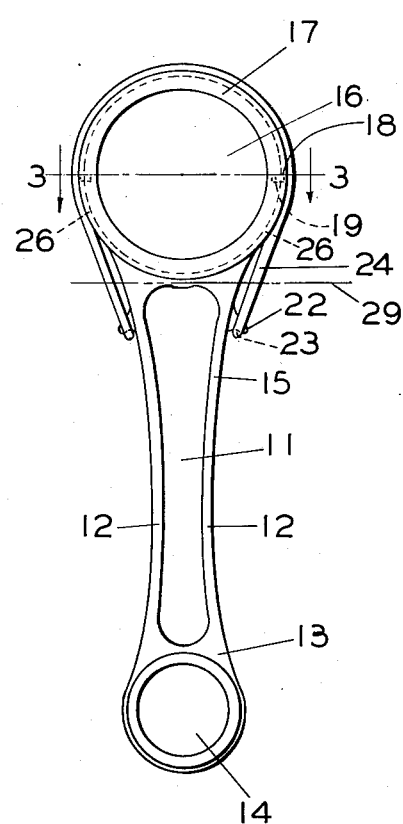
Figure 2 is a front elevational view of the connecting rod illustrated in Figure 1.
Figure 2:
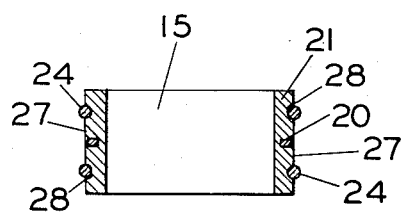

Integrally formed with the flange portions 12 of the shank 10 and spaced intermediate the ends 13, 15 thereof are a pair of outwardly projecting lugs 22. The upper surfaces 23 of the lugs 22 slope inwardly toward the end 15 for a purpose which will be explained hereinafter. The bearing cap or sleeve 17 is firmly held on the end 15 of the shank 10 by means of an endless steel strap 24. The strap 24 is looped over one of the lugs 22 and is wrapped about the exterior cylindrical surface 25 of the sleeve 17 and segments 26 of the exterior cylindrical surface 27 of the end 15 and is forced, under tension, over the other lug 22 to tightly clamp the sleeve to the end 15. A pair of spaced grooves 28 are cut in the exterior surfaces 25, 27 to form pockets for receiving and confining the strap 24. Inasmuch as the upper surfaces 23 of the lugs 22 are inclined inwardly toward the end 15 the strap 24 is prevented from slipping off the lugs and tends to seat on the juncture of the lug and its respective flange portion 12. It will be noted in Figure 2 that the upper surfaces 23 are also curved as are the surfaces 25 and 27 over which the strap 24 extends. By this construction the strap is uniformly stressed since there are practically no localized points of high stress concentration. Furthermore, the strap 24, being in tension when assembled on the connecting rod, pre-stresses, in compression, the structure enclosed by it and the lugs 22. This assembly characteristic is extremely important because it is a known fact that there is an area of high tensile stress corresponding to the juncture of the crankshaft bearing 16 and the shank 10 (indicated by a plane 29) where the majority of connecting rods fail by fracturing. The spacing of the lugs 22, longitudinally away from the plane 29 to include the high tensile stress area within the structure pre-stressed in compression greatly increases the durability of the connecting rod.

The embodiment of the invention chosen for the purposes of illustration and description herein is that preferred for achieving the objects of the invention and developing the utility thereof in the most desirable manner, due regard being had to existing factors of economy, simplicity of design, construction, and assembly production methods, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A connecting rod comprising a shank having a semi-cylindrical bearing portion formed on one end thereof and further having a pair of transversely spaced, oppositely projecting lugs spaced intermediate its ends; a detachable semi-cylindrical sleeve abutting said bearing portion to form a cylindrical bearing, the diameter of said bearing being greater than the transverse distance between said lugs; and an endless strap looped over each of said lugs and wrapped about the exterior surface of said sleeve to maintain said sleeve in abutting relationship with said bearing portion.

2. A connecting rod comprising a shank having a semi-cylindrical bearing portion formed on one end thereof and further having a pair of transversely spaced attachment elements longitudinally spaced from the juncture of the shank and bearing portion; a semi-cylindrical sleeve adapted to mate with said bearing portion to form a cylindrical bearing, the diameter of said bearing being greater than the transverse distance between said attachment elements; and strap means having portions thereof engaging said attachment elements for connecting said sleeve to said bearing portion.

3. A connecting rod substantially as set forth in claim 2, in which said strap means includes an endless strap engaging the exterior surface of said sleeve and segments of the exterior surface of said bearing portion, said engaged surfaces having arcuately extending grooves provided therein to serve as pockets for receiving the surface engaging portions of said endless strap.

4. In a connecting rod comprising an elongated shank having a semi-cylindrical bearing portion formed on one end thereof and a semi-cylindrical sleeve adapted to mate with said bearing portion to form a cylindrical crankshaft bearing; means for connecting the sleeve to the bearing portion including a pair of transversely spaced oppositely projecting lugs provided on the shank, said lugs being longitudinally spaced from the bearing portion and the transverse distance between said lugs being less than the diameter of the crankshaft bearing, and an endless strap looped over each of said lugs and wrapped about the exterior surface of said sleeve and arcuate segments of the exterior surface of said bearing portion.

5. The combination, substantially as set forth in claim 4, in which the exterior surfaces of said bearing portion and said sleeve have arcuately extending grooves provided therein to serve as pockets for receiving portions of said endless strap.

6. Means for fastening the mating semi-cylindrical bearing sleeves of a bearing together, including a pair of oppositely projecting, spaced lugs fixed to one of the bearing sleeves, the distance between said lugs being less than the diameter of said bearing, and an endless strap engaging said lugs and an arcuate segments of the exterior surface of the bearing, said arcuate segment having arcuately extending grooves provided therein for receiving portions of said strap.

7. The combination, substantially as set forth in claim 6, in which the exterior surface of the bearing engaged by the strap is arcuately greater than 180°.

References Cited in the file of this patent

UNITED STATES PATENTS

| 19,602 | Zimmerman | Mar. 9, 1858 |
| 116,542 | Blake | July 4, 1871 |
| 425,119 | Aitken | Apr. 8, 1890 |
| 465,454 | Bunker | Dec. 22, 1891 |
| 795,034 | Harris | July 18, 1905 |
| 1,226,447 | Bedrang | May 15, 1917 |
| 2,100,965 | Kuskie | Nov. 30, 1937 |

FOREIGN PATENTS

| 446,728 | Great Britain | May 5, 1936 |